US008013099B2

(12) United States Patent
Poppe et al.

(10) Patent No.: US 8,013,099 B2

(45) **Date of Patent: *Sep. 6, 2011**

(54) USE OF PHOSPHONIC ACID DIESTERS AND DIPHOSPHONIC ACID DIESTERS AND SILANE GROUP CONTAINING, CURABLE MIXTURES CONTAINING PHOSPHONIC ACID DIESTERS AND DIPHOSPHONIC ACID DIESTERS

(75) Inventors: Andreas Poppe, Sendenhorst (DE); Elke Westhoff, Steinfurt (DE); Simone Hesener, Munster (DE); Manuela Niemeier, Drensteinfurt (DE); Wilfried Stubbe, Greven (DE)

(73) Assignee: BASF Coatings AG, Munster (DE)

( * ) Notice: Subject to any disclaimer, the term of this patent is extended or adjusted under 35 U.S.C. 154(b) by 342 days.

This patent is subject to a terminal disclaimer.

(21) Appl. No.: 12/067,683

(22) PCT Filed: Sep. 13, 2006

(86) PCT No.: PCT/EP2006/008908

§ 371 (c)(1), (2), (4) Date: Mar. 21, 2008

(87) PCT Pub. No.: WO2007/033786

PCT Pub. Date: Mar. 29, 2007

(65) Prior Publication Data

US 2008/0245999 A1 Oct. 9, 2008

(30) Foreign Application Priority Data

Sep. 22, 2005 (DE) ......................... 10 2005 045 228

(51) Int. Cl.
*C08G 77/04* (2006.01)

(52) U.S. Cl. ......................................... 528/28; 528/398

(58) Field of Classification Search .................... 528/28, 528/398

See application file for complete search history.

(56) References Cited

U.S. PATENT DOCUMENTS

| | | | |
|---|---|---|---|
| 3,251,785 A | 5/1966 | Anderson | |
| 3,525,705 A | 8/1970 | Harowitz | |
| 3,746,572 A | 7/1973 | Weil et al. | |
| 4,419,513 A | 12/1983 | Breidenbach et al. | |
| 4,454,317 A | 6/1984 | Disteldorf et al. | |
| 4,547,397 A | 10/1985 | Burzynski et al. | |
| 4,631,142 A | 12/1986 | Sturtz | |
| 4,801,675 A | 1/1989 | Pedain et al. | |
| 5,258,482 A | 11/1993 | Jacobs et al. | |
| 5,290,902 A | 3/1994 | Jacobs et al. | |
| 5,679,804 A | 10/1997 | Ditrich et al. | |
| 5,728,779 A | 3/1998 | van de Werff et al. | |
| 6,111,002 A * | 8/2000 | Doring et al. | 524/262 |
| 6,392,006 B1 | 5/2002 | Van Benthem et al. | |
| 7,078,474 B2 | 7/2006 | Hermann et al. | |
| 2003/0176537 A1 | 9/2003 | Chaiko | |
| 2004/0077801 A1 | 4/2004 | Feola et al. | |
| 2005/0074617 A1 | 4/2005 | Lin et al. | |
| 2006/0009606 A1 | 1/2006 | Hermann et al. | |
| 2006/0156960 A1 | 7/2006 | Wombacher et al. | |
| 2008/0245998 A1 | 10/2008 | Poppe et al. | |
| 2008/0245999 A1 | 10/2008 | Poppe et al. | |
| 2010/0015344 A1 | 1/2010 | Groenewolt et al. | |

FOREIGN PATENT DOCUMENTS

| | | |
|---|---|---|
| CA | 2163591 A1 | 6/1996 |
| DE | 2559259 A1 | 7/1977 |
| DE | 2809588 A1 | 11/1978 |
| DE | 4015155 A1 | 11/1991 |
| DE | 4024204 A1 | 2/1992 |
| DE | 4229183 A1 | 3/1994 |
| DE | 4344063 C1 | 6/1995 |
| DE | 19650478 A1 | 6/1998 |
| DE | 19828935 A1 | 12/1999 |
| DE | 19924170 A1 | 11/2000 |
| DE | 19938758 A1 | 2/2001 |
| DE | 19948004 A1 | 7/2001 |
| DE | 10051485 A1 | 4/2002 |
| DE | 10132654 A1 | 10/2002 |
| DE | 10202819 C1 | 8/2003 |
| DE | 102004060966 A1 | 6/2006 |
| DE | 102005045228 A1 | 4/2007 |
| EP | 0183976 A1 | 6/1986 |
| EP | 0267689 A2 | 5/1988 |
| EP | 0303150 A2 | 2/1989 |
| EP | 0496208 A2 | 7/1992 |
| EP | 0524500 A1 | 1/1993 |
| EP | 0531820 A1 | 3/1993 |
| EP | 0566037 A2 | 10/1993 |
| EP | 0646608 A1 | 4/1995 |
| EP | 0649806 A1 | 4/1995 |
| EP | 0882748 A2 | 12/1998 |
| EP | 0976723 A2 | 2/2000 |
| EP | 1193278 | 8/2001 |

(Continued)

OTHER PUBLICATIONS

Hohenesche et al., Journal of Chromatography A, 1025 (2004) 177-187.*

International Search Report dated Sep. 13, 2006 for International Application No. PCT/EP2006/008908.

Written Opinion of International Searching Authority dated Sep. 13, 2006 for International Application No. PCT/EP2006/008908.

International Preliminary Report (English Translation) dated Apr. 8, 2008 for International Application No. PCT/EP2006/008908.

CAS Registry file search for Dimethyl Methylphosphonate.

CAS Registry file search for Diphosphonic acid.

CAS Registry file search for Neopentyl Methylphosphonate.

CAS Registry file search for Phosphonic acid.

International Preliminary Report on Patentability for International Application No. PCT/EP2006/009177 dated Apr. 8, 2008.

(Continued)

*Primary Examiner* — Kuo-Liang Peng

(74) *Attorney, Agent, or Firm* — Cantor Colburn LLP

(57) ABSTRACT

Disclosed herein is a silane-functional mixture, comprising at least one phosphonic diester (A), at least one diphosphonic diester (A), or at least one phosphonic diester and one diphosphonic diester (A), and at least one compound (B) comprising at least two condensable silane groups.

21 Claims, No Drawings

FOREIGN PATENT DOCUMENTS

| | | | |
|---|---|---|---|
| EP | 1134266 | A1 | 9/2001 |
| EP | 1195397 | A1 | 4/2002 |
| EP | 1475360 | A1 | 5/2003 |
| JP | 62260868 | | 11/1987 |
| WO | WO9916810 | A1 | 4/1999 |
| WO | WO0031194 | A1 | 6/2000 |
| WO | WO0037520 | A1 | 6/2000 |
| WO | WO0055270 | A1 | 9/2000 |
| WO | WO0064763 | A1 | 11/2000 |
| WO | WO0109260 | A1 | 2/2001 |
| WO | WO0109261 | A1 | 2/2001 |
| WO | WO01009231 | A1 | 2/2001 |
| WO | WO01009259 | A1 | 2/2001 |
| WO | WO03011992 | A2 | 2/2003 |
| WO | WO2004072189 | A2 | 8/2004 |
| WO | WO2005105938 | A1 | 11/2005 |
| WO | WO2007033786 | A1 | 3/2007 |
| WO | WO2007033826 | A1 | 3/2007 |

OTHER PUBLICATIONS

International Preliminary Report on Patentability for International Application No. PCT/EP2007/000660 dated Jan. 20, 2009.

International Search Report for International Application No. PCT/EP2008/002291 dated Jul. 1, 2008.

International Search Report for International Application No. PCT/EP2006/009177 dated Nov. 24, 2006.

International Preliminary Report on Patentability for International Application No. PCT/EP2008/002291 dated Sep. 29, 2009.

International Search Report for International Application No. PCT/EP2007/000660 dated Oct. 25, 2007.

Written Opinion for International Application No. PCT/EP2007/000660 filed Jan. 26, 2007.

Written opinion for International Application No. PCT/EP2008/02291 filed on Mar. 20, 2008.

Written Opinion for International Application No. PCT/EP2006/009177 dated Nov. 24, 2006.

* cited by examiner

USE OF PHOSPHONIC ACID DIESTERS AND DIPHOSPHONIC ACID DIESTERS AND SILANE GROUP CONTAINING, CURABLE MIXTURES CONTAINING PHOSPHONIC ACID DIESTERS AND DIPHOSPHONIC ACID DIESTERS

CROSS REFERENCE TO RELATED APPLICATIONS

This application is a National Phase Application of International Patent Application PCT/EP2006/008908, filed on Sep. 13, 2006, which claims priority to German patent application DE 10 2005 045 228.0, filed on Sep. 22, 2005.

FIELD OF THE INVENTION

The present invention relates to the new use of phosphonic diesters and diphosphonic diesters as a constituent of silane-functional mixtures. The present invention also relates to new, silane-functional, curable mixtures comprising phosphonic diesters and diphosphonic diesters as a constituent.

BACKGROUND

Phosphonic diesters are esters of phosphonic acid [HP(O)$(OH)_2$], which is tautomeric with phosphorous acid [P$(OH)_3$]. The phosphonic diesters are frequently also referred to, not entirely correctly, as secondary phosphites. However, the true derivatives of phosphorous acid are only the triesters.

Diphosphonic diesters are the diesters of diphosphonic acid:

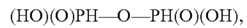

(HO)(O)PH—O—PH(O)(OH), formerly also referred to as diphosphorous acid.

(Cf. in this regard Römpp Lexikon der Chemie, Georg Thieme Verlag, Stuttgart, N.Y., 1990, “Phosphites”, “Phosphonates”, “Phosphonic acid”, “Diethyl phosphite”, and “Dimethyl phosphite”.)

Silane-functional, water-free, thermally curable mixtures, particularly coating materials, which can crosslink by polycondensation via the silane groups are known from international patent application WO 2004/072189 A2 or European patent applications EP 0 267 689 A2 and EP 1 193 278 A1.

The known silane-functional, water-free, thermally curable mixtures comprise optionally amine-blocked acidic phosphoric esters, optionally amine-blocked sulfonic acids, organotin compounds, such as dibutyltin dilaurate, dibutyltin diacetate, tin octoate or dibutyltin oxide, amines, such as triethylamine, tetramethylguanidine or triethylenediamine, and compounds of titanium, of tin(II), of zinc or of bismuth as thermal curing catalysts.

Each of these catalysts, however, has specific drawbacks.

Thus the strongly acidic catalysts exhibit the undesired phenomenon of severe interactions with customary, known light stabilizers of the kind used in thermally curable mixtures, particularly coating materials. Furthermore, they may lower the storage stability of the known silane-functional, water-free, thermally curable mixtures to such an extent that the mixtures gel prematurely.

The metal catalysts and the amine catalysts lead frequently to instances of yellowing, which manifests itself interferingly in the case in particular of clearcoats produced from the known silane-functional, water-free, thermally curable mixtures.

SUMMARY

The present invention is based on the object of finding a new use of phosphonic diesters and diphosphonic diesters and thus broadening their usefulness in order to enrich the art.

The present invention is also based on the object of finding new silane-functional mixtures comprising phosphonic diesters and/or diphosphonic diesters.

The new silane-functional mixtures ought to be easy to prepare and stable on storage even at temperatures above room temperature, at 40° C. for example, for lengthy periods, but at least four weeks. Preferably, however, they should be sufficiently reactive that they can be cured rapidly without problems even under the conditions of automotive OEM finishing, for example, at 100 to 160° C. for 10 to 60 minutes.

Not least, the new silane-functional mixtures, particularly the coating materials, ought to give thermally cured materials, particularly coatings, which are particularly hard, abrasion-resistant, highly scratch-resistant, particularly chemically stable and etch-resistant, and also, as clearcoats, of particularly high gloss and clarity.

Found accordingly has been the new use of phosphonic diesters and/or diphosphonic diesters (A) in silane-functional mixtures, this being referred to below as “inventive use”.

Also found have been the new silane-functional mixtures comprising (A) at least one phosphonic diester and/or at least one diphosphonic diester and (B) at least one compound containing at least two condensable silane groups, and referred to below as “mixtures of the invention”.

Additional subject matter of the invention will become apparent from the description.

DETAILED DESCRIPTION

In the light of the prior art it was surprising and unforeseeable for the skilled worker that the object on which the present invention was based could be achieved by means of the inventive use and of the mixtures of the invention.

In particular it was surprising that the inventive use extraordinarily broadened the application possibilities of phosphonic diesters and diphosphonic diesters (A), thereby enriching the art.

In particular the inventive use allowed for the provision of innovative, curable, especially thermally curable mixtures which could be cured by the polycondensation of condensable silane groups.

It was surprising, moreover, that by virtue of the inventive use the polycondensation of compounds containing silane groups proceeded particularly rapidly and without problems.

The mixtures of the invention were easy to prepare and were stable on storage even at temperatures above room temperature, at 40° C. for example, for lengthy periods, but at least four weeks. Nevertheless they were sufficiently reactive that they could be cured rapidly and without problems even under the conditions of automotive OEM finishing, for example, at 100 to 160° C. for 10 to 60 minutes.

Surprising not least was the fact that the mixtures of the invention gave new thermally cured mixtures, particularly new coatings, which were particularly hard, particularly abrasion-resistant, highly scratch-resistant, particularly chemically stable and etch-resistant, and also, as clearcoats, of particularly high gloss and clarity.

DETAILED DESCRIPTION OF THE INVENTION

In accordance with the invention the phosphonic diesters (A) are used as a constituent of silane-functional mixtures.

For the inventive use the phosphonic diesters and diphosphonic diesters (A) are selected preferably from the group consisting of acyclic phosphonic diesters, cyclic phosphonic diesters, acyclic diphosphonic diesters, and cyclic diphosphonic diesters.

The acyclic phosphonic diesters (A) are preferably selected from the group consisting of acyclic phosphonic diesters (A) of the general formula I:

(I)

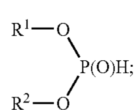

In the general formula I the radicals $R^1$ and $R^2$ are identical or different from one another; preferably they are identical.

The radicals $R^1$ and $R^2$ are selected from the group consisting of:

substituted and unsubstituted alkyl- having 1 to 20, preferably 2 to 16, and in particular 2 to 10 carbon atoms, cycloalkyl- having 3 to 20, preferably 3 to 16, and in particular 3 to 10 carbon atoms, and aryl- having 5 to 20, preferably 6 to 14, and in particular 6 to 10 carbon atoms, the hyphen symbolizing in each case the covalent bond between a carbon atom of the radical $R^1$ or $R^2$ and the oxygen atom of the O—P group;

substituted and unsubstituted alkylaryl-, arylalkyl-, alkylcycloalkyl-, cycloalkylalkyl-, arylcycloalkyl-, cycloalkylaryl-, alkylcycloalkylaryl-, alkylarylcycloalkyl-, arylcycloalkylalkyl-, arylalkylcycloalkyl-, cycloalkylalkylaryl-, and cycloalkylarylalkyl-, the alkyl, cycloalkyl-, and aryl groups therein each containing the above-recited number of carbon atoms and the hyphen symbolizing in each case the covalent bond between a carbon atom of the radical $R^1$ and $R^2$ and the oxygen atom of the O—P group; and substituted and unsubstituted radical—of the above-recited kind, containing at least one heteroatom selected from the group consisting of oxygen atom, sulfur atom, nitrogen atom, phosphorus atom, and silicon atom, in particular oxygen atom, sulfur atom, and nitrogen atom, the hyphen symbolizing the covalent bond between a carbon atom of the radical and the oxygen atom of the O—P group.

The cyclic phosphonic diesters (A) are preferably selected from the group consisting of the cyclic phosphonic diesters (A) of the general formula II:

(II)

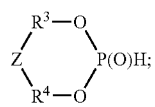

In the general formula II the radicals $R^3$ and $R^4$ are identical or different from one another; preferably they are identical.

The radicals $R^3$ and $R^4$ are selected from the group consisting of:

substituted and unsubstituted, divalent alkyl- having 1 to 20, preferably 1 to 10, and in particular 1 to 6 carbon atoms, cycloalkyl- having 3 to 20, preferably 3 to 10, and in particular 3 to 6 carbon atoms, and aryl- having 5 to 20, preferably 6 to 14, and in particular 6 to 10 carbon atoms, the hyphen symbolizing in each case the covalent bond between a carbon atom of the radical $R^3$ or $R^4$ and the oxygen atom of the O—P group;

substituted and unsubstituted, divalent alkylaryl-, arylalkyl-, alkylcycloalkyl-, cycloalkylalkyl-, arylcycloalkyl-, cycloalkylaryl-, alkylcycloalkylaryl-, alkylarylcycloalkyl-, arylcycloalkylalkyl-, arylalkylcycloalkyl-, cycloalkylalkylaryl-, and cycloalkylarylalkyl-, the alkyl, cycloalkyl-, and aryl groups therein each containing the above-recited number of carbon atoms and the hyphen symbolizing in each case the covalent bond between a carbon atom of the radical $R^3$ and $R^4$ and the oxygen atom of the O—P group; and substituted and unsubstituted, divalent radical—of the above-recited kind, containing at least one, in particular one heteroatom selected from the group consisting of oxygen atom, sulfur atom, nitrogen atom, phosphorus atom, and silicon atom, the hyphen symbolizing the covalent bond between a carbon atom of the radical and the oxygen atom of the O—P group;

In the general formula II the variable Z is a covalent bond between an atom of the radical $R^3$ and an atom of the radical $R^4$;

a divalent linking group selected from the group consisting of oxygen atom, substituted, especially oxygen-substituted, and unsubstituted sulfur atom, substituted, especially alkyl-substituted, nitrogen atom, substituted, especially oxygen-substituted, phosphorus atom, and substituted, especially alkyl- and alkoxy-substituted, silicon atom, especially oxygen atom; or a divalent linking group selected from the group consisting of substituted and unsubstituted alkyl having 1 to 10, preferably 1 to 6, and in particular 1 to 4 carbon atoms, cycloalkyl having 3 to 10, preferably 3 to 6, and in particular 6 carbon atoms, and aryl having 5 to 10, and in particular 6 carbon atoms, said alkyl cycloalkyl, and aryl being heteroatom-free or containing at least one heteroatom selected from the group consisting of oxygen atom, sulfur atom, nitrogen atom, phosphorus atom, and silicon atom, especially oxygen atom, sulfur atom, and nitrogen atom.

Preferably the acyclic diphosphonic diesters (A) are selected from the group consisting of the acyclic diphosphonic diesters (A) of the general formula III:

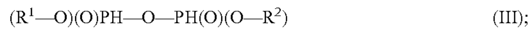

$$(R^1—O)(O)PH—O—PH(O)(O—R^2) \quad \text{(III);}$$

in which the variables are as defined above.

Preferably the cyclic diphosphonic diesters (A) are selected from the group consisting of the cyclic diphosphonic diesters (A) of the general formula IV:

(IV)

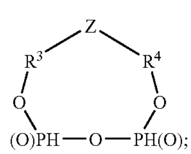

in which the variables are as defined above.

Suitable substituents for the radicals $R^1$, $R^2$, $R^3$, and $R^4$ include all groups and atoms which do not adversely affect the action of the phosphonic diesters and of the diphosphonic diesters (A), do not inhibit the curing reactions in the mixtures of the invention, do not lead to unwanted side reactions, and induce no toxic action. Examples of suitable substituents are halogen atoms, nitrile groups or nitro groups, preferably halogen atoms, especially fluorine atoms, chlorine atoms and bromine atoms.

Preferably the radicals $R^1$, $R^2$, $R^3$, and $R^4$ are unsubstituted.

Preferably the radicals $R^1$ and $R^2$ are selected from the group consisting of phenyl, methyl, and ethyl. More preferably phenyl is used.

Preferably the acyclic phosphonic diesters (A) of the general formula I are used.

More preferably the radicals $R^1$ and $R^2$ of the acyclic phosphonic diesters (A) of the general formula I are selected from the group consisting of phenyl, methyl, and ethyl. Phenyl in particular is used.

An example of an especially suitable phosphonic diester (A) of the general formula I is diphenyl phosphonate, which is sometimes also referred to by those in the art (not entirely correctly) as diphenyl phosphite.

Suitable silane-functional mixtures for the purposes of the invention include, in particular, organic, silane-functional mixtures. The silane groups in the mixtures may be linked to monomeric, oligomeric or polymeric substructures. The silane groups may also, in particular as siloxane groups, themselves form the building blocks of the substructures. They may additionally be slow to react or inert. Preferably they are reactive, particularly in hydrolysis and/or condensation reactions.

A particular advantage of the inventive use is that the phosphonic diesters (A) display their outstanding actions in silane-functional mixtures even in comparatively small amounts.

The mixtures of the invention necessarily comprise (A) at least one, especially one, of the above-described phosphonic diesters and (B) at least one, especially one, compound containing at least two, in particular at least three, condensable silane groups.

They may further comprise at least one further constituent (C) as well.

In one given compound (B) one substructure is linked to at least two, in particular at least three, condensable silane groups.

The condensable silane groups preferably have the general formula V:

$$—SiR^5{}_mR^6{}_{3-m} \quad (V)$$

in which the index and variables have the following definitions:

m is an integer from 1 to 3, especially 3;

$R^5$ is a monovalent condensable atom or monovalent condensable organic radical;

$R^6$ is a monovalent inert organic radical.

The monovalent condensable atoms are preferably selected from the group consisting of hydrogen atoms, fluorine atoms, chlorine atoms, and bromine atoms.

The monovalent condensable organic radicals $R^5$ are preferably selected from the group consisting of hydroxyl groups and the groups of the general formula VI:

$$-R^{16}-R^6 \quad (VI),$$

in which the variable $-R^{16}$ is a divalent linking atom or a divalent linking functional group and, $R^6$ is as defined above.

The monovalent inert organic radicals $R^6$ are preferably selected from the group consisting of monovalent, substituted, and unsubstituted alkyl having preferably 1 to 20, more preferably 2 to 16, and in particular 2 to 10 carbon atoms, cycloalkyl- having preferably 3 to 20, more preferably 3 to 16, and in particular 3 to 10 carbon atoms, and aryl- having preferably 5 to 20, more preferably 6 to 14, and in particular 6 to 10 carbon atoms;

monovalent substituted and unsubstituted alkylaryl, arylalkyl, alkylcycloalkyl, cycloalkylalkyl, arylcycloalkyl, cycloalkylaryl, alkylcycloalkylaryl, alkylaryl-cycloalkyl, arylcycloalkylalkyl, arylalkylcycloalkyl, cycloalkylalkylaryl, and cycloalkylarylalkyl, the alkyl, cycloalkyl, and aryl groups present preferably each containing the above-recited number of carbon atoms; and monovalent substituted and unsubstituted radical of the kind recited above, containing at least one, especially one, heteroatom selected from the group consisting of oxygen atom, sulfur atom, nitrogen atom, phosphorus atom, and silicon atom, especially oxygen atom, sulfur atom, and nitrogen atom;

suitable substituents being those described above.

The divalent linking atoms $R^{16}$ are preferably selected from the group consisting of oxygen atoms and sulfur atoms, especially oxygen atoms.

The divalent linking functional groups $R^{16}$ are preferably selected from the group consisting of —C(═$R^8$)—, —$R^7$—C(═$R^8$)—, —C(═$R^8$)—$R^7$—, —NH—, and —N(—$R^6$)—, in which the variable $R^8$ is a divalent atom, in which the variable $R^7$ is a divalent linking atom or a divalent linking functional group and in particular is an oxygen atom or a sulfur atom, and the variable $R^6$ is as defined above, "═" symbolizing a double bond, and the covalent bond symbolized by the left-hand outer hyphen linking the group of the general formula VI to the silicon atom of the group of the general formula V.

In particular the divalent atoms $R^8$ are selected from the group consisting of oxygen atoms and sulfur atoms, especially oxygen atoms.

With very particular preference the divalent linking atoms $R^7$ are used.

In particular the silane groups of the general formula V are selected from the group consisting of trimethoxysilyl and triethoxysilyl groups.

The compounds (B) may be monomeric, oligomeric or polymeric in construction, i.e., they may have a monomeric, an oligomeric, or a polymeric substructure.

"Monomeric" means that the compound (B) in question or its substructure is composed substantially of one structural unit or of two structural units, which may be identical to or different from one another.

"Oligomeric" means that the compound (B) in question or its substructure is composed on average of 3 to 12 monomeric structural units, which may be identical to or different from one another.

"Polymeric" means that the compound (B) in question or its substructure is composed on average of at least 8 monomeric structural units, which may be identical to or different from one another.

Whether a compound (B) or its substructure composed on average of 8 to 12 monomeric structural units is regarded by the skilled worker as an oligomer or as a polymer depends in particular on the number-average and mass-average molecular weight of such a compound (B) or substructure. Where the molecular weights are comparatively high, it will be referred to as a polymer; where they are comparatively low, as an oligomer.

The monomeric substructures of the compounds (B) derive from customary, known organic compounds of low molecular weight.

The oligomeric and polymeric substructures of the compounds (B) derive preferably from the customary, known, organic and organometallic oligomers and polymers. These may have any of a very wide variety of structures. By way of example they may be linear, star-shaped, comb-shaped or irregularly branched, dendrimeric or annular, and more than one of these structures may be present in one compound (B). The structures may feature a random and/or blockwise distribution of the monomeric structural units.

The oligomeric and polymeric substructures of the compounds (B) derive more preferably from the customary, known oligomers and polymers preparable by free-radical, anionic or cationic polymerization of olefinically or acetylenically, preferably olefinically, unsaturated monomers, by polycondensation or by polyaddition.

The oligomeric and polymeric substructures of the compounds (B) derive with particularly preference from the customary, known polyolefins, polystyrenes, polyacrylonitriles, (meth)acrylate (co)polymers, polyesters, polyamides, polyphenylene oxides, and polyurethanes.

With particular preference the substructures of the compounds (B) contain at least one group, and in particular at least two groups, selected from the group consisting of the groups of the general formulae (VII 1), (VII 2), and (VII 3):

$$-R^{10}-R^{11}-R^{12}- \qquad \text{(VII 1)}$$

$$-R^{10}-R^{11}-R^{12}= \qquad \text{(VII 2) and}$$

$$-R^{10}-R^{11}-R^{12}< \qquad \text{(VII 3)}$$

in which the variables $R^{10}$, $R^{11}$, and $R^{12}$ have the definition elucidated in detail below in connection with the general formula VII.

With very particular preference the compounds (B) have the general formula VII:

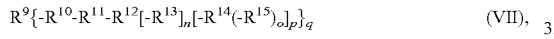

$$R^9\{-R^{10}-R^{11}-R^{12}[-R^{13}]_n[-R^{14}(-R^{15})_o]_p\}_q \qquad \text{(VII),}$$

in which the indices and variables have the following definitions:

- n is 0 or 1;
- o is 1, 2 or 3;
- p is 1 or 2;
- q is an integer from 1 to 10, with the proviso that o=2 or 3 and/or p=2, if q=1;
- $R^9$ is an at least monovalent, preferably at least divalent, and in particular at least trivalent inert organic radical, with the proviso that o=2 or 3 and/or p=2, if $R^9$=monovalent organic radical;
- $R^{10}$ in the first alternative=group —NH—, with the proviso that
  - (i) the groups $R^{12}$ are linked, via the covalent bonds symbolized by the left-hand outer hyphens, to the carbon atom of the group $R^{11}$ and are linked, by the covalent bonds symbolized by the right-hand outer hyphens, by "<" or by "=", to the radicals $R^{14}$ or $R^{14}$ and $R^{13}$; or
  - in a second alternative=groups $R^2$, with the provisos that
  - (ii) the group $R^{12}$ linked directly to $R^{14}$=—NH— and
  - (iii) the groups $R^{12}$ are linked, via the covalent bonds symbolized by the left-hand outer hyphens, to the carbon atom of the group $R^{11}$ and are linked, by the covalent bonds symbolized by the right-hand outer hyphens, by "<" or by "=", to the radicals $R^9$;
- $R^{11}$ is a group —C(=$R^8$)—, in which "=$R^8$" is as defined above;
- $R^{12}$ is a divalent or trivalent atom selected from the group consisting of divalent linking atoms $R^7$ and trivalent nitrogen atoms —N< and —N=, in which "=" symbolizes a double bond; or is a divalent or trivalent linking functional group selected from the group consisting of —NH—, —N(—$R^6$)— —NH—C(=$R^8$)—, —NH[—C(=$R^8$)—]$_2$, —NH—C(=$R^8$)—NH—, —NH—C(=$R^8$)—$R^7$—, —NH—C(=$R^8$)—NH—C(=$R^8$)—$R^7$—, —$R^7$—N=, —$R^7$—NH—C(=$R^8$)—, and —NH—C(=$R^8$)—NH—N=C<, in which "=$R^8$", $R^7$, and $R^6$ are as defined above;
- $R^{13}$ is a monovalent inert organic radical $R^6$ or a group of the general formula VIII:

$$-R^{14}(-R^{15})_o \qquad \text{(VIII),}$$

in which the index o is as defined above and the radicals $R^{14}$ and $R^{15}$ are as defined below;
- $R^{14}$ is an at least divalent inert organic radical;
- $R^{15}$ is a silane group of the general formula V.

Preferably the at least monovalent radicals $R^9$ are selected from the group consisting of

- at least monovalent, substituted, and unsubstituted alkyl having preferably 1 to 20, more preferably 2 to 16, and in particular 2 to 10 carbon atoms, cycloalkyl- having preferably 3 to 20, more preferably 3 to 16, and in particular 3 to 10 carbon atoms, and aryl- having preferably 5 to 20, more preferably 6 to 14, and in particular 6 to 10 carbon atoms;
- at least monovalent substituted and unsubstituted alkylaryl, arylalkyl, alkylcycloalkyl, cycloalkylalkyl, arylcycloalkyl, cycloalkylaryl, alkylcycloalkylaryl, alkylarylcycloalkyl, arylcycloalkylalkyl, arylalkylcycloalkyl, cycloalkylalkylaryl, and cycloalkylarylalkyl, the alkyl, cycloalkyl, and aryl groups present preferably each containing the above-recited number of carbon atoms; and
- at least monovalent substituted and unsubstituted radical of the kind recited above, containing at least one, especially one, heteroatom selected from the group consisting of oxygen atom, sulfur atom, nitrogen atom, phosphorus atom, and silicon atom, especially oxygen atom, sulfur atom, and nitrogen atom;

suitable substituents being those described above.

Preferably the radical $R^{10}$ is an —NH— group (=first alternative).

Preferably the radical $R^{11}$ is a —C(=O)— group.

Preferably the radicals $R^{12}$ are selected from the group consisting of trivalent nitrogen atoms —N< and divalent linking functional groups —N(—$R^6$)—, in which the variable $R^6$ is as defined above, more preferably methyl, ethyl, propyl, isopropyl, n-butyl, isobutyl, sec-butyl, and tert-butyl, especially n-butyl.

More preferably the radicals $R^{12}$ are linked, via the covalent bonds symbolized by the left-hand outer hyphens, to the carbon atom of the group $R^{11}$ and are linked, by the covalent bonds symbolized by the right-hand outer hyphens or by "<", to the radicals $R^{14}$ or $R^{14}$ and $R^{13}$ (=first alternative).

Preferably the at least divalent, in particular divalent, radicals $R^{14}$ are selected from the group consisting of

- at least divalent, substituted, and unsubstituted alkyl having preferably 1 to 20, more preferably 2 to 16, and in particular 2 to 10 carbon atoms, cycloalkyl- having preferably 3 to 20, more preferably 3 to 16, and in particular 3 to 10 carbon atoms, and aryl- having preferably 5 to 20, more preferably 6 to 14, and in particular 6 to 10 carbon atoms;
- at least divalent substituted and unsubstituted alkylaryl, arylalkyl, alkylcycloalkyl, cycloalkylalkyl, arylcycloalkyl, cycloalkylaryl, alkylcycloalkylaryl, alkylarylcycloalkyl, arylcycloalkylalkyl, arylalkylcycloalkyl, cycloalkylalkylaryl, and cycloalkylarylalkyl, the alkyl, cycloalkyl, and aryl groups present preferably each containing the above-recited number of carbon atoms; and at least divalent substituted and unsubstituted radical of the kind recited above, containing at least one, especially one, heteroatom selected from the group consisting of oxygen atom, sulfur atom, nitrogen atom, phosphorus atom, and silicon atom, especially oxygen atom, sulfur atom, and nitrogen atom;

suitable substituents being those described above. Propane-1,3-diyl in particular is used.

The above-described compounds (B) can be prepared by the customary, known processes of organosilicon chemistry.

Preferably they are preparable by reacting (a) in a first alternative at least one compound of the general formula IX:

$$R^9(N{=}C{=}R^8)_q \qquad \text{(IX)},$$

in which the index q and the variable $R^9$ are as defined above and $R^8$ is an oxygen atom or a sulfur atom, with at least one compound of the general formula X:

$$H{-}R^{12}[{-}R^{13}]_n[{-}R^{14}({-}R^{15})_o]_p \qquad \text{(X)},$$

in which the indices and variables are as defined above, or (b) in a second alternative at least one compound of the general formula XI:

$$R^9({-}R^{12}{-}H)_q \qquad \text{(XI)},$$

in which the index and variables are as defined above, with at least one compound of the general formula XII:

$$R^8{=}C{=}N{-}R^{14}({-}R^{15})_o \qquad \text{(XII)},$$

in which the index and variables are as defined above.

Preferably the first alternative (a) is employed.

Preferably in the case of the two alternatives (a) and (b) an equivalents ratio of the complementary reactive functional groups

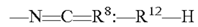

close to 1, more preferably 1.5:1 to 1:1.5, very preferably 1.3:1 to 1:1.3, and in particular 1.2:1 to 1:1.2 is employed.

Examples of suitable compounds of the general formula X are monoisocyanates, such as ethyl, propyl, butyl, pentyl, hexyl, heptyl, octyl, nonyl, decyl, undecyl, lauryl, cyclohexyl or phenyl isocyanate;

diisocyanates, such as tetramethylene 1,4-diisocyanate, hexamethylene 1,6-diisocyanate, 2,2,4-trimethylhexamethylene 1,6-diisocyanate, omega,omega'-dipropyl ether diisocyanate, cyclohexyl 1,4-diisocyanate, cyclohexyl 1,3-diisocyanate, cyclohexyl 1,2-diisocyanate, dicyclohexylmethane 4,4'-diisocyanate, 1,5-dimethyl-2,4-di(isocyanatomethyl)benzene, 1,5-dimethyl-2,4-di(isocyanatoethyl)benzene, 1,3,5-trimethyl-2,4-di(isocyanatomethyl)benzene, 1,3,5-triethyl-2,4-di(isocyanatomethyl)benzene, isophorone diisocyanate, dicyclohexyldimethylmethane 4,4'-diisocyanate, 2,4-tolylene diisocyanate, 2,6-tolylene diisocyanate, and diphenylmethane-4,4'-diisocyanate; and polyisocyanates, such as triisocyanates such as nonane triisocyanate (NTI) and also polyisocyanates based on the above-described diisocyanates and triisocyanates, especially oligomers containing isocyanurate, biuret, allophanate, iminooxadiazinedione, urethane, carbodiimide, urea and/or uretdione groups, known for example from the patents and patent applications CA2,163,591 A 1, U.S. Pat. No. 4,419,513 A, U.S. Pat. No. 4,454,317 A, EP 0 646 608 A 1, U.S. Pat. No. 4,801,675 A, EP 0 183 976 A 1, DE 40 15 155 A 1, EP 0 303 150 A 1, EP 0 496 208 A 1, EP 0 524 500 A 1, EP 0 566 037 A 1, U.S. Pat. No. 5,258,482 A, U.S. Pat. No. 5,290,902 A, EP 0 649 806A 1, DE 42 29 183A 1 or EP 0 531 820A 1 and having advantageously an NCO functionality of 2.0-5.0, preferably of 2.2-4.0, in particular of 2.5-3.8;

the high-viscosity polyisocyanates of the kind described in German patent application DE 198 28 935 A 1; and also the polyisocyanates known from German patent application DE 199 24 170 A 1, column 2, lines 6 to 34, column 4, line 16, to column 6, line 62, the polyisocyanates known from international patent applications WO 00/31194, page 11, line 30, to page 12, line 26, and WO 00/37520, page 5, line 4, to page 6, line 27, and the polyisocyanates known from European patent application EP 0 976 723 A2, page 12, paragraph [0128], to page 22, paragraph [0284].

Examples of suitable compounds of the general formula XI are N,N-bis(3-trimethoxysilylpropan-1-yl)amine, N,N-bis(3-triethoxysilylpropan-1-yl)amine, N-(3-trimethoxysilylpropan-1-yl)-N-n-butylamine or N-(3-triethoxysilylpropan-1-yl)-N-n-butylamine.

Examples of suitable compounds of the general formula XII are the customary, known aliphatic, cycloaliphatic, aromatic, aliphatic-cycloaliphatic, aliphatic-aromatic or aliphatic-cycloaliphatic-aromatic alcohols, thiols, thioalcohols, phenols, amines, aminoalcohols, aminothiols or aminothioalcohols containing at least one hydroxyl group, at least one thiol group and/or at least one primary and/or secondary amino group.

Examples of suitable compounds of the general formula XIII are 3-trimethoxysilylpropan-1-yl isocyanate or 3-triethoxysilylpropan-1-yl isocyanate.

In terms of method the preparation of the compounds (B) has no peculiarities but instead takes place with the aid of the customary, known methods and apparatus for the handling and reaction of polyisocyanates and organic silicon compounds, with the customary, known safety measures for the handling of polyisocyanates being taken.

In general the compounds of the general formulae X and XI or XII and XIII are reacted with one another until free isocyanate groups are no longer detectable in the reaction mixtures in question by means of the customary, known methods of qualitative and quantitative detection of isocyanate groups.

The mixtures of the invention may not least further comprise at least one additive (C) in the customary, known, effective amounts. The additive (C) is preferably selected from the group consisting of organic solvents, binders and crosslinking agents different than the compounds (B), compounds which can be activated with actinic radiation, especially UV radiation, organic and inorganic, colored and achromatic, optical effect, electrically conductive, magnetically shielding, and fluorescent pigments, transparent and opaque, organic and inorganic fillers, nanoparticles; stabilizers, UV absorbers; light stabilizers, free-radical scavengers, photoinitiators, free-radical polymerization initiators, driers, devolatilizers, slip additives, polymerization inhibitors, defoamers, emulsifiers and wetting agents, adhesion promoters, flow control agents, film-forming assistants, rheology control additives, and flame retardants.

Preference is given to using stabilizers, more preferably glycols, very preferably propylene glycol, butyl glycol, and homologs having 5 to 10 carbon atoms in the molecule, and especially propylene glycol and butyl glycol.

The amount of phosphonic diesters and/or diphosphonic diesters (A) in the mixtures of the invention may vary very widely and is guided by the requirements of the case in hand, so that it can be tailored to the specific case. Preferably the phosphonic diesters and/or diphosphonic diesters (A) are present in a mixture of the invention in an amount of 1% to 40%, more preferably 2% to 30%, and in particular 3% to 20%, by weight, based in each case on the solids of the mixture of the invention.

The amount of compounds (B) in the mixtures of the invention may likewise vary very widely and be tailored to the requirements of the case in hand. Preferably the compounds (B) are present in a mixture of the invention in an amount of 60% to 99%, more preferably 70% to 98%, and in particular 80% to 97%, by weight, based in each case on the solids of the mixture of the invention.

For the purposes of the present invention the solids equates to the total of all the constituents of a mixture of the invention, a curable mixture of the invention for example, which, following removal of the volatile constituents, constitute the nonvolatile residue: for example, a cured material of the invention.

The solids content of the mixtures of the invention may also vary very widely and therefore be tailored to the requirements of the case in hand. The solids content is preferably 100% by weight; in other words, the mixture of the invention contains no volatile constituents in the sense referred to above. If volatile constituents of this kind are present then the solids content, based in each case on the mixture of the invention, is preferably 20% to 80%, more preferably 25% to 70%, and in particular 30% to 65% by weight.

The mixtures of the invention are preferably water-free. This means that they contain, at most, traces of water introduced unintentionally via the constituents, in the course of their preparation, and/or via atmospheric moisture, in the course of their preparation and/or handling. More preferably the water content is below the detection limits of the customary, known methods of qualitative and quantitative determination of water.

The mixtures of the invention are preferably curable, more preferably thermally curable. The thermal cure takes place in particular by the polycondensation of the condensable silane groups present in the mixtures of the invention, to form three-dimensional networks, i.e., new thermoset materials.

The thermal cure accomplished by polycondensation, by means of the condensable silane groups present in the mixtures of the invention, may additionally be assisted by other, customary, known mechanisms of thermal curing, using complementary reactive functional groups other than the condensable silane groups by physical curing, as a result of the formation of a film by suitable film-forming constituents, and/or by curing with actinic radiation, especially UV radiation. These modes of curing serve for advantageous variation of the curing via the condensable silane groups, which is characteristic for the mixtures of the invention and defines their profile of performance properties.

The mixtures of the invention may be in any of a very wide variety of physical states and three-dimensional forms.

Thus the mixtures of the invention may at room temperature be solid or liquid or fluid. Alternatively they may be solid at room temperature and fluid at higher temperatures, exhibiting preferably thermoplastic behavior. In particular they may be conventional mixtures comprising organic solvents, aqueous mixtures, substantially or entirely solvent- and water-free liquid mixtures (100% systems), substantially or entirely solvent- and water-free solid powders, or substantially or entirely solvent-free powder suspensions (powder slurries). They may also be one-component systems, in which all of the constituents are present alongside one another in one component, or may be two-component or multicomponent systems, in which at least one particularly reactive constituent, a polyisocyanate or polyepoxide for example, is present in a separate component, separated from the other constituents, until shortly before the preparation and application of the mixture of the invention in question. The mixtures of the invention are, in particular, one-component systems comprising organic solvents.

In terms of method the preparation of the mixtures of the invention has no peculiarities but instead takes place by the mixing and homogenizing of the above-described constituents, by means of customary, known mixing methods and apparatus such as stirred tanks, agitator mills, extruders, compounders, Ultraturrax devices, inline dissolvers, static mixers, micromixers, toothed-wheel dispersers, pressure release nozzles and/or microfluidizers, in the absence of actinic radiation where appropriate. The selection of the optimum method for any given individual case is guided in particular by the physical state and three-dimensional form which the mixture of the invention is to have. Where, for example, a thermoplastic mixture of the invention is to take the form of a sheet or a laminate, extrusion through a slot die is particularly appropriate for the preparation of the mixture of the invention and for its shaping.

For the purposes of the process of the invention the mixtures of the invention are used to produce new cured materials, especially new thermoset materials, which serve any of a very wide variety of end uses and are referred to below as "materials of the invention".

The mixtures of the invention are preferably starting products for moldings and sheets or else are coating materials, adhesives or sealants, especially coating materials.

Materials of the invention are preferably new moldings, sheets, coatings, adhesive layers, and seals, especially new coatings.

In particular the coating materials of the invention are used as new electrocoat materials, surfacers, antistonechip primers, solid-colored topcoat materials, aqueous basecoat materials and/or clearcoat materials, especially clearcoat materials, to produce new multicoat color and/or effect, electrically conductive, magnetically shielding or fluorescent paint systems, especially multicoat color and/or effect paint systems. For producing the multicoat paint systems of the invention it is possible to employ the customary, known wet-on-wet techniques and/or extrusion techniques, and also the customary, known paint or sheet constructions.

The materials of the invention are produced by applying the mixtures of the invention to customary, known temporary or permanent substrates.

The sheets and moldings of the invention are preferably produced using customary, known temporary substrates, such as metal and plastic belts and sheets or hollow bodies of metal, glass, plastic, wood or ceramic, which are easily removable without damaging the sheets and moldings of the invention produced from the mixtures of the invention.

Where the mixtures of the invention are used to produce the coatings, adhesives, and seals of the invention, permanent substrates are employed, such as bodies of means of transport, especially motor vehicle bodies, and parts thereof, the interior and exterior of buildings and parts thereof, doors, windows, furniture, hollow glassware, coils, containers, packaging, small parts, optical, mechanical, and electrical components, and components of white goods. The sheets and moldings of the invention may likewise serve as permanent substrates.

In terms of method the application of the mixtures of the invention has no peculiarities but may instead take place by all customary, known application methods suitable for the mixture of the invention in question, such as extrusion, electrocoating, injecting, spraying, including powder spraying, knifecoating, spreading, pouring, dipping, trickling or rolling, for example. Preference is given to employing extrusion methods and spray application methods, particularly spray application methods.

Following their application the mixtures of the invention are subjected to customary, known thermal curing.

The thermal cure takes place in general after a certain rest time or flashoff time. This may have a duration of 30 s to 2 h, preferably 1 min to 1 h and in particular 1 to 45 min. The rest time serves, for example, for the flow and devolatilization of films of the mixtures of the invention, and for evaporation of volatile constituents such as any solvent and/or water present. Flashing off can be accelerated by an elevated temperature, but below that sufficient for curing, and/or by a reduced atmospheric humidity.

This process measure is also employed for drying the applied mixtures of the invention, particularly the films of the coating materials of the invention, especially the films of the paint coats of the invention which are not to be cured or are to be only part-cured.

The thermal cure is accomplished, for example, with the aid of a gaseous, liquid and/or solid hot medium, such as hot air, heated oil or heated rolls, or microwave radiation infrared light and/or near infrared (NIR) light. Heating preferably is accomplished in a forced-air oven or by exposure to IR and/or NIR lamps. Curing may also take place in stages. The thermal cure is accomplished preferably at temperatures from room temperature to 200° C., more preferably from room temperature to 180° C., and in particular from room temperature to 160° C.

The thermal cure may additionally be assisted by the additional curing methods described above, using, where appropriate, the customary, known apparatus, for curing for example with actinic radiation, especially UV radiation.

The resultant materials of the invention, especially the resultant sheets, moldings, coatings, adhesive layers, and seals of the invention, are outstandingly suitable for the coating, adhesive bonding, sealing, wrapping, and packaging of bodies of means of transport, especially motor vehicle bodies, and parts thereof, the interior and exterior of buildings and parts thereof, doors, windows, furniture, hollow glassware, coils, containers, packaging, small parts, such as nuts, bolts, wheel rims or hub caps, optical components, mechanical components, electrical components, such as windings (coils, stators, rotors), and also components for white goods, such as radiators, household appliances, refrigerator casings or washing-machine casings.

The mixtures of the invention afford very particular advantages when used as clearcoat materials of the invention to produce new clearcoats.

The clearcoats of the invention are usually the outermost coats of multicoat paint systems or sheets or laminates, which substantially determine the overall appearance and protect the substrates and/or the color and/or effect coats of multicoat paint systems or sheets or laminates against mechanical and chemical damage and against radiation-induced damage. Consequently, deficiencies in hardness, scratch resistance, chemical stability, and yellowing stability in the clearcoat are manifested to a particularly severe extent. The clearcoats of the invention produced, however, exhibit little yellowing. They are highly scratch-resistant, and after scratching exhibit only very low losses of gloss. In particular the loss of gloss in the Amtec/Kistler carwash simulation test is very low. At the same time they have a high hardness and a particularly high chemical resistance. Not least they exhibit outstanding substrate adhesion and intercoat adhesion.

EXAMPLES

Preparation Example 1

The Preparation of Compound (B1)

A reaction vessel equipped with stirrer, reflux condenser, oil heating, and nitrogen inlet tube was charged with 456.38 parts by weight of a commercial polyisocyanate (Basonat® HI 100 from BASF Aktiengesellschaft) and 228 parts by weight of a commercial aromatic solvent mixture (Solventnaphta®). Added slowly to this mixture with stirring were 815.62 parts by weight of N,N-bis(3-trimethoxysilylpropan-1-yl)amine (Dynasilan® 1124 from Degussa). Subsequently the reaction mixture was heated at 50° C. with stirring for two hours. After that time, free isocyanate groups were no longer detectable by IR spectroscopy. The solution of compound (B1) had a solids content of 84% to 85% by weight.

Preparation Example 2

The Preparation of Compound (B2)

A reaction vessel equipped with stirrer, reflux condenser, oil heating, and nitrogen inlet tube was charged with 82 parts by weight of a commercial polyisocyanate (Vestanat® T 1890 from Degussa) and 82 parts by weight of a commercial aromatic solvent mixture (Solventnaphta®). Added slowly to this mixture with stirring were 86 parts by weight of N-(3-trimethoxysilylpropan-1-yl)-N-n-butylamine (Dynasilan® 1189 from Degussa). Subsequently the reaction mixture was heated at 50° C. with stirring for two hours. After that time, free isocyanate groups were no longer detectable by IR spectroscopy. The solution of compound (B2) had a solids content of 52% to 53% by weight

Preparation Example 3

The Preparation of Compound (B3)

A reaction vessel equipped with stirrer, reflux condenser, oil heating, and nitrogen inlet tube was charged with 48.38 parts by weight of a commercial polyisocyanate (Vestanat® T 1890 from Degussa) and 48.38 parts by weight of a commercial aromatic solvent mixture (Solventnaphta®). Added slowly to this mixture with stirring were 32.82 parts by weight of N-(3-trimethoxysilylpropan-1-yl)-N-n-butylamine (Dynasilan® 1189 from Degussa) and 20.42 parts by weight of N,N-bis(3-trimethoxysilylpropan-1-yl)amine (Silquest® A 1170 from Witco). Subsequently the reaction mixture was heated at 50° C. with stirring for two hours. After that time, free isocyanate groups were no longer detectable by IR spectroscopy. The solution of compound (B3) had a solids content of 58% by weight

Preparation Example 4

The Preparation of Additive (C1)

A reaction vessel equipped with stirrer, reflux condenser, two feed vessels, and oil heating was charged with 71.04 parts by weight of Solventnaphtha® and this initial charge was heated to 145° C. with stirring. Subsequently, at this temperature, a mixture of 100.1 parts by weight of methyl methacrylate and 6.79 parts by weight of isodecyl methacrylate was metered from one feed vessel at a uniform rate with stirring over two hours. Beginning at the same time a solution of 25.96 parts by weight of tert-butyl hydroperoxide in 49.4 parts by weight of Solventnaphtha® was metered from the other feed vessel at a uniform rate with stirring over five hours. After the end of the second feed the reaction mixture was polymerized further at 145° C. for 1.5 hours. The resultant methacrylate resin solution had a solids content of 47% by weight. The molecular weight distribution of the methacrylate resin was determined by means of gel permeation chromatography, using polystyrene as internal standard. The residual monomer content was measured by means of gas chromatography. The results obtained were as follows:

mass-average molecular weight: 2.874 daltons;
number-average molecular weight: 1.132 daltons;
molecular weight at peak maximum: 2.876 daltons;

polydispersity of molecular weight: 2.5; and
residual monomer content: ≦0.5% by weight.

Example 1

The Preparation of One-Component Clearcoat Material 1 and Production of Multicoat Paint Systems 1 (Silver) and 1 (Black), each Comprising Clearcoat 1

The one-component clearcoat material 1 was prepared by mixing 92 parts by weight of compound (B2) from preparation example 2, 0.5 part by weight of commercial paint additive Byk® 301 from Byk Chemie, 1.1 part by weight of commercial light stabilizer Tinuvin® 384 from Ciba Specialty Chemicals, 1 part by weight of commercial light stabilizer Tinuvin® 292 from Ciba Specialty Chemicals, 25 parts by weight of Solventnaphtha®, 0.25 part by weight of commercial paint additive Byk® 390 from Byk Chemie, and 8 parts by weight of diphenyl phosphonate (diphenyl phosphite) and homogenizing the resulting mixture.

One-component clearcoat material 1 was stable on storage; it was stored without problems at 40° C. for four weeks without any observable increase in viscosity.

One-component clearcoat material 1 was applied to metal test panels which had each been coated with a customary, known cathodically deposited, thermally cured electrocoat, a customary, known thermally cured surfacer coat, and a film, predried at 80° C. for 10 minutes, of a commercial, conventional, black basecoat material from BASF Coatings A G. The basecoat film and the clearcoat film were cured jointly at 140° C. for 22 minutes. The resulting basecoat had a film thickness of 7.5 μm and the clearcoat a film thickness of 30 μm.

The chemical stability was determined by means of the customary, known gradient oven test and by means of the customary, known test GME 604409, in which 38 percent strength sulfuric acid acts on the multicoat paint systems at room temperature for 72 hours. The results were assessed visually and scored with ratings from 1 to 10. At a rating of 8 or more the test result was satisfactory.

The scratch resistance was determined by means of the carwash simulation test using a laboratory wash line from Amtec Kistler (cf. T. Klimmasch, T. Engbert, Technologietage, Cologne, DFO, Report Volume 32, pages 59 to 66, 1997). The exposure was determined by measuring the residual gloss of the sample after the carwash simulation test and after subsequent wiping with a wipe soaked with wash benzine.

The scratch resistance was also determined using the Crockmeter (9 μm paper grade).

The results are found in table 1.

TABLE 1

Chemical stability and scratch resistance of multicoat paint systems 1 (silver) and 1 (black)

| Test | Multicoat paint system: | |
|---|---|---|
| | 1 (silver) | 1 (black) |
| Chemical stability Gradient oven test: (Beginning of damage after 24 hours at ° C.) | | |
| Sulfuric acid | 51 | 47 |
| NaOH | 70 | 55 |
| Pancreatin | 43 | 50 |
| Tree resin | >75 | >75 |
| Distilled water | 55 | >75 |

TABLE 1-continued

Chemical stability and scratch resistance of multicoat paint systems 1 (silver) and 1 (black)

| Test | Multicoat paint system: | |
|---|---|---|
| | 1 (silver) | 1 (black) |
| GME 60409: | | |
| Surface change after 72 hours | not measured | rating 9 |
| Scratch resistance Amtec/Kistler: | | |
| Initial gloss (20°) | not measured | 85 |
| Gloss (20°) without cleaning | not measured | 38 |
| Gloss (20°) after cleaning | not measured | 58 |
| Reflow (2 hours/80° C.): | | |
| Gloss (20°) uncleaned side | not measured | 41 |
| Gloss (20°) cleaned side | not measured | 60 |
| Crockmeter: | | |
| Residual gloss (%) | not measured | 67 |

The results underscore the surprisingly high chemical stability of the multicoat paint systems 1 (silver) and 1 (black) and also the high gloss and high scratch resistance of multicoat paint system 1 (black). Measurement of the scratch resistance of multicoat paint system 1 (silver) was therefore not carried out, because scratch resistance is usually determined using black paint systems, where the damage picture is very much more easily perceived than in the case of silver paint systems.

Example 2

The Preparation of One-Component Clearcoat Material 2 and Production of Multicoat Paint System 2 (Black), Comprising Clearcoat 2

The one-component clearcoat material 1 was prepared by mixing 100 parts by weight of compound (B3) from preparation example 3, 0.5 part by weight of commercial paint additive Byk® 358 from Byk Chemie, 1.1 part by weight of commercial light stabilizer Tinuvin® 384 from Ciba Specialty Chemicals, 1 part by weight of commercial light stabilizer Tinuvin® 292 from Ciba Specialty Chemicals, 25 parts by weight of Solventnaphtha®, 3 parts by weight of butyl glycol diacetate, and 8 parts by weight of diphenyl phosphonate and homogenizing the resulting mixture.

One-component clearcoat material 1 was stable on storage; it was stored without problems at 40° C. for four weeks without any observable increase in viscosity.

One-component clearcoat material 2 was applied to metal test panels which had each been coated with a customary, known cathodically deposited, thermally cured electrocoat, a customary, known thermally cured surfacer coat, and a film, predried at 80° C. for 10 minutes, of a commercial, conventional, black basecoat material from BASF Coatings AG. The basecoat film and the clearcoat film were cured jointly at 140° C. for 22 minutes. The resulting basecoat had a film thickness of 7.5 μm and the clearcoat a film thickness of 30 μm.

The same investigations were carried out as in the case of example 1. The results are found in table 2. They underscore the surprisingly high chemical stability and also the high gloss and high scratch resistance of the multicoat paint system 2 (black).

TABLE 2

Chemical stability and scratch resistance of multicoat paint system 2 (black)

| Test | Multicoat paint system: 2 (black) |
| --- | --- |
| Chemical stability Gradient oven test: (Beginning of damage after 24 hours at ° C.) | |
| Sulfuric acid | 47 |
| NaOH | <37 |
| Pancreatin | 38 |
| Tree resin | >75 |
| Distilled water | >75 |
| GME 60409: | |
| Surface change after 72 hours | rating 8 |
| Scratch resistance Amtec/Kistler: | |
| Initial gloss (20°) | 83 |
| Gloss (20°) without cleaning | 42 |
| Gloss (20°) without cleaning | 53 |
| Crockmeter: | |
| Residual gloss (%) | 78 |

Example 3

The Preparation of One-Component Clearcoat Material 3 and Production of Multicoat Paint System 3 (Black), Comprising Clearcoat 3

The one-component clearcoat material 3 was prepared by mixing 92 parts by weight of compound (B1) from preparation example 1, 45 parts by weight of compound (B2) from preparation example 2, 5 parts by weight of additive (C) from preparation example 4, 0.5 part by weight of commercial paint additive Byk® 358 from Byk Chemie, 1.1 part by weight of commercial light stabilizer Tinuvin® 384 from Ciba Specialty Chemicals, 1 part by weight of commercial light stabilizer Tinuvin® 292 from Ciba Specialty Chemicals, 57 parts by weight of Solventnaphtha®, 6 parts by weight of propylene glycol, and 8 parts by weight of diphenyl phosphonate and homogenizing the resulting mixture.

One-component clearcoat material 3 was stable on storage; it was stored without problems at 40° C. for four weeks without any observable increase in viscosity.

One-component clearcoat material 3 was applied to metal test panels which had each been coated with a customary, known cathodically deposited, thermally cured electrocoat, a customary, known thermally cured surfacer coat, and a film, predried at 80° C. for 10 minutes, of a commercial, black aqueous basecoat material from BASF Coatings AG. The basecoat film and the clearcoat film were cured jointly at 140° C. for 22 minutes. The resulting basecoat had a film thickness of 7.5 μm and the clearcoat a film thickness of 30 μm.

The same investigations were carried out as in the case of example 1. The results are found in table 3. They underscore the surprisingly high chemical stability and also the high gloss and high scratch resistance of the multicoat paint system 3 (black).

TABLE 3

Chemical stability and scratch resistance of multicoat paint system 3 (black)

| Test | Multicoat paint system: 3 (black) |
| --- | --- |
| Chemical stability Gradient oven test: (Beginning of damage after 24 hours at ° C.) | |
| Sulfuric acid | 52 |
| NaOH | <37 |
| Pancreatin | 46 |
| Tree resin | >75 |
| Distilled water | 51 |
| GME 60409: | |
| Surface change after 72 hours | rating 8 |
| Scratch resistance Amtec/Kistler: | |
| Residual gloss (20°) after cleaning 90% of the initial gloss | |
| Crockmeter: | |
| Residual gloss (%) | 98 |

Overall the results of tables 1 to 3 show that the profile of properties of one-component clearcoat materials based on compounds (B) and phosphonic diesters (A) was able to be varied and optimized in a surprisingly simple way.

What is claimed is:

1. A silane-functional mixture, comprising:
at least one phosphonic diester (A), at least one diphosphonic diester (A), or at least one phosphonic diester and one diphosphonic diester (A), and
at least one compound (B) comprising at least two condensable silane groups.

2. The silane-functional mixture of claim 1, wherein the phosphonic diesters (A) are selected from the group consisting of acyclic phosphonic diesters and cyclic phosphonic diesters, and wherein the diphosphonic diesters (A) are selected from the group consisting of acyclic diphosphonic diesters and cyclic diphosphonic diesters.

3. The silane-functional mixture of claim 2, wherein the acyclic phosphonic diesters have the general formula I:

$$\begin{matrix} R^1\text{—O} \\ \quad\diagdown \\ \qquad P(O)H; \\ \quad\diagup \\ R^2\text{—O} \end{matrix} \quad \text{(I)}$$

wherein $R^1$ and $R^2$ are identical or different from one another and are selected from the group consisting of:
substituted and unsubstituted alkyl- having 1 to 20 carbon atoms, cycloalkyl- having 3 to 20 carbon atoms, and aryl- having 5 to 20 carbon atoms, the hyphen symbolizing in each case the covalent bond between a carbon atom of the radical $R^1$ or $R^2$ and the oxygen atom of the O—P group;
substituted and unsubstituted alkylaryl-, arylalkyl-, alkylcycloalkyl-, cycloalkylalkyl-, arylcycloalkyl-, cycloalkylaryl-, alkylcycloalkylaryl-, alkylarylcycloalkyl-, arylcycloalkylalkyl-, arylalkylcycloalkyl-, cycloalkylalkylaryl-, and cycloalkylarylalkyl-, the alkyl, cycloalkyl-, and aryl groups therein each containing the above-recited number of carbon atoms and the hyphen symbolizing in each case the covalent bond between a carbon atom of the radical $R^1$ and $R^2$ and the oxygen atom of the O—P group; and substituted and unsubstituted radical—of the above-recited kind, containing at least one heteroatom selected from the group consisting of oxygen atom, sulfur atom, nitrogen atom, phosphorus atom, and silicon atom, the hyphen symbolizing the covalent bond between a carbon atom of the radical and the oxygen atom of the O—P group.

4. The silane-functional mixture of claim 3, wherein the acyclic diphosphonic diesters have the general formula III:

$$(R^1\text{—O})(\text{O})\text{PH—O—PH(O)}(\text{O—}R^2) \quad \text{(III)}.$$

5. The silane-functional mixture of claim 4, wherein $R^1$ and $R^2$ are identical or different from one another and are selected from the group consisting of phenyl, methyl, and ethyl.

6. The silane-functional mixture of claim 5, wherein $R^1$ and $R^2$ are phenyl.

7. The silane-functional mixture of claim 2, wherein the cyclic phosphonic diesters have the general formula II:

(II)

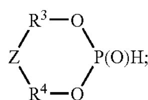

wherein $R^3$ and $R^4$ are identical or different from one another and are selected from the group consisting of:

substituted and unsubstituted, divalent alkyl- having 1 to 20 carbon atoms, cycloalkyl- having 3 to 20 carbon atoms, and aryl- having 5 to 20 carbon atoms, the hyphen symbolizing in each case the covalent bond between a carbon atom of the radical $R^3$ or $R^4$ and the oxygen atom of the O—P group;

substituted and unsubstituted, divalent alkylaryl-, arylalkyl-, alkylcycloalkyl-, cycloalkylalkyl-, arylcycloalkyl-, cycloalkylaryl-, alkylcycloalkylaryl-, alkylarylcycloalkyl-, arylcycloalkylalkyl-, arylalkylcycloalkyl-, cycloalkylalkylaryl-, and cycloalkylarylalkyl-, the alkyl, cycloalkyl-, and aryl groups therein each containing the above-recited number of carbon atoms and the hyphen symbolizing in each case the covalent bond between a carbon atom of the radical $R^3$ and $R^4$ and the oxygen atom of the O—P group; and substituted and unsubstituted, divalent radical—of the above-recited kind, containing at least one hetero atom selected from the group consisting of oxygen atom, sulfur atom, nitrogen atom, phosphorus atom, and silicon atom, the hyphen symbolizing the covalent bond between a carbon atom of the radical and the oxygen atom of the O—P group;

wherein Z is a covalent bond between an atom of the radical $R^3$ and an atom of the radical $R^4$ or is a divalent linking group selected from the group consisting of oxygen atom, substituted and unsubstituted sulfur atom, substituted nitrogen atom, substituted phosphorus atom, substituted silicon atom, substituted and unsubstituted alkyl having 1 to 10 carbon atoms, cycloalkyl having 3 to 10 carbon atoms, and aryl having 5 to 10 carbon atoms, said alkyl, cycloalkyl, and aryl being free from heteroatoms or containing at least one heteroatom selected from the group consisting of oxygen atom, sulfur atom, nitrogen atom, phosphorus atom, and silicon atom.

8. The silane-functional mixture of claim 7, wherein the cyclic diphosphonic diesters have the general formula IV:

(IV)

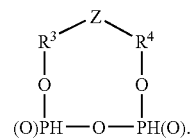

9. The silane-functional mixture of claim 1, wherein the at least two condensable silane group have the general formula V:

$$\text{—Si}R^5{}_m R^6{}_{3-m} \quad \text{(V)};$$

wherein m is an integer from 1 to 3, $R^5$ is a monovalent condensable atom or monovalent condensable organic radical, and $R^6$ is a monovalent inert organic radical.

10. The silane-functional mixture of claim 9, wherein the monovalent condensable atom is selected from the group consisting of hydrogen atoms, fluorine atoms, chlorine atoms, and bromine atoms, and the monovalent condensable organic radical $R^5$ is selected from the group consisting of hydroxyl groups and the groups of the general formula VI:

$$\text{-}R^{16}\text{-}R^6 \quad \text{(VI)};$$

wherein $R^{16}$ is a divalent linking atom or a divalent linking functional group.

11. The silane-functional mixture of claim 10, wherein the divalent linking atom $R^{16}$ is an oxygen atom or is selected from the group consisting of —C(═$R^8$)—, —$R^7$—C(═$R^8$)—, —C(═$R^8$)—$R^7$—, —NH—, and —N(—$R^6$)—, wherein $R^7$ is a divalent linking atom or a divalent linking functional group, $R^8$ is a divalent atom, "═" symbolizes a double bond, and the covalent bond symbolized by the left-hand outer hyphen links the group of the general formula VI to the silicon atom of the group of general formula V.

12. The silane-functional mixture of claim 10, wherein the silane group of the general formula VI is selected from the group consisting of trimethoxysilyl and triethoxysilyl groups.

13. The silane-functional mixture of claim 9, wherein the monovalent inert organic radical $R^6$ is selected from the group consisting of the radicals $R^1$ or $R^2$;

wherein $R^1$ and $R^2$ are identical or different from one another and are selected from the group consisting of:

substituted and unsubstituted alkyl- having 1 to 20 carbon atoms, cycloalkyl- having 3 to 20 carbon atoms, and aryl- having 5 to 20 carbon atoms, the hyphen symbolizing in each case the covalent bond between a carbon atom of the radical $R^1$ or $R^2$ and the oxygen atom of the O—P group;

substituted and unsubstituted alkylaryl-, arylalkyl-, alkylcycloalkyl-, cycloalkylalkyl-, arylcycloalkyl-, cycloalkylaryl-, alkylcycloalkylaryl-, alkylarylcycloalkyl-, arylcycloalkylalkyl-, arylalkylcycloalkyl-, cycloalkylalkylaryl-, and cycloalkylarylalkyl-, the alkyl, cycloalkyl-, and aryl groups therein each containing the above-recited number of carbon atoms and the hyphen symbolizing in each case the covalent bond between a carbon atom of the radical $R^1$ and $R^2$ and the oxygen atom of the O—P group; and substituted and unsubstituted radical—of the above-recited kind, containing at least one heteroatom selected from the group consisting of oxygen atom, sulfur atom, nitrogen atom, phosphorus atom, and silicon atom, the hyphen symbolizing the covalent bond between a carbon atom of the radical and the oxygen atom of the O—P group.

14. The silane-functional mixture of claim 1, wherein the at least one compound (B) has the general formula VII:

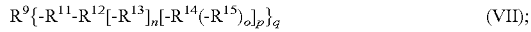

$$R^9\{\text{-}R^{11}\text{-}R^{12}[\text{-}R^{13}]_n[\text{-}R^{14}(\text{-}R^{15})_o]_p\}_q \quad \text{(VII);}$$

wherein:

n is 0 or 1;

o is 1, 2 or 3;

p is 1 or 2;

q is an integer from 1 to 10, with the proviso that o=2 or 3 and/or p=2, if q=1;

$R^9$ is an at least monovalent inert organic radical, with the proviso that o=2 or 3 and/or p=2, if $R^9$=monovalent organic radical;

$R^{10}$ is —NH—, with the proviso that the groups $R^{12}$ are linked, via the covalent bonds symbolized by the left-hand outer hyphens, to the carbon atom of the group $R^{11}$ and are linked, by the covalent bonds symbolized by the right-hand outer hyphens, by "<" or by "═", to the radicals $R^{14}$ or $R^{14}$ and $R^{13}$; or $R^{10}$ is alternatively a divalent or trivalent atom selected from the group consisting of divalent linking atoms $R^7$ and trivalent nitrogen atoms —N< and —N═, in which "═" symbolizes a double bond; or a divalent or trivalent linking functional group selected from the group consisting of —NH—, —N(—$R^6$)—NH—C(═$R^8$)—, —NH[—C(═$R^8$)—]$_2$, —NH—C(═$R^8$)—NH—, —NH—C(═$R^8$)—$R^7$—, —NH—C(═$R^8$)—NH—C(═$R^8$)—$R^7$—, —$R^7$—N═, —$R^7$—NH—C(═$R^8$)—, and —NH—C(═$R^8$)—NH—N═C<, wherein $R^7$, $R^8$, and $R^6$ are as defined in this claim;

with the provisos that the group $R^{12}$ linked directly to $R^{14}$=—NH— and the groups $R^{12}$ are linked, via the covalent bonds symbolized by the left-hand outer hyphens, to the carbon atom of the group $R^{11}$ and are linked, by the covalent bonds symbolized by the right-hand outer hyphens, by "<" or by "═", to the radicals $R^9$;

$R^{11}$ is a group —C(═$R^8$)—, wherein $R^8$ is as defined in this claim;

$R^{12}$ is a divalent or trivalent atom selected from the group consisting of divalent linking atoms $R^7$ and trivalent nitrogen atoms —N< and —N═, in which "═" symbolizes a double bond; or $R^{12}$ is a divalent or trivalent linking functional group selected from the group consisting of —NH—, —N(—$R^6$)—NH—C(═$R^8$)—, —NH[—C(═$R^8$)—]$_2$, —NH—C(═$R^8$)—NH—, —NH—C(═$R^8$)—$R^7$—, —NH—C(═$R^8$)—NH—C(═$R^8$)—$R^7$—, —$R^7$—N═, —$R^7$—NH—C(═$R^8$)—, and —NH—C(═$R^8$)—NH—N═C<, wherein $R^7$ is a divalent linking atom or a divalent linking functional group, $R^8$, and $R^6$ are as defined in this claim;

the covalent bond symbolized by the left-hand outer hyphen linking the atom or the group $R^7$ to the carbon atom of the group $R^{11}$;

$R^{13}$ is a monovalent inert organic radical $R^6$ or a group of the general formula VIII:

$$\text{-}R^{14}(\text{-}R^{15})_o \quad \text{(VIII)}$$

wherein o is as defined above; and $R^{14}$ is an at least divalent inert organic radical;

$R^{15}$ is a silane group of the general formula V:

$$\text{—}SiR^5_mR^6_{3-m} \quad \text{(V);}$$

wherein m is an integer from 1 to 3, $R^5$ is a monovalent condensable atom or monovalent condensable organic radical, and $R^6$ is as defined in this claim;

$R^6$ is a monovalent inert organic radical;

$R^7$ is a divalent linking atom or a divalent linking functional group; and $R^8$ is a divalent atom.

15. The silane-functional mixture of claim 1, wherein the at least one compound (B) is prepared by reacting:

at least one compound of the general formula IX:

$$R^9(N{=}C{=}R^8)_q \quad \text{(IX),}$$

wherein q is an integer from 1 to 10;

$R^9$ is an at least monovalent inert organic radical;

$R^8$ is an oxygen atom or a sulfur atom;

with at least one compound of the general formula X:

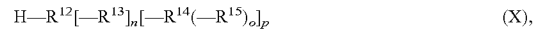

$$H\text{—}R^{12}[\text{—}R^{13}]_n[\text{—}R^{14}(\text{—}R^{15})_o]_p \quad \text{(X),}$$

wherein:

n is 0 or 1;

o is 1, 2 or 3;

p is 1 or 2;

wherein $R^{12}$ is a divalent or trivalent linking functional group selected from the group consisting of —NH—, —N(—$R^6$)—NH—C(═$R^8$)—, —NH[—C(═$R^8$)—]$_2$, —NH—C(═$R^8$)—NH—, —NH—C(═$R^8$)—$R^7$—, —NH—C(═$R^8$)—NH—C(═$R^8$)—$R^7$—, —$R^7$—N═, —$R^7$—NH—C(═$R^8$)—, and —NH—C(═$R^8$)—NH—N═C<, wherein $R^7$ is a divalent linking atom or a divalent linking functional group and $R^6$ and $R^8$ are as defined in this claim;

$R^{13}$ is a monovalent inert organic radical $R^6$ or a group of the general formula VIII:

$$\text{-}R^{14}(\text{-}R^{15})_o \quad \text{(VIII)}$$

$R^{14}$ is an at least divalent inert organic radical;

$R^{15}$ is a silane group of the general formula V:

$$\text{—}SiR^5_mR^6_{3-m} \quad \text{(V);}$$

wherein m is an integer from 1 to 3, $R^5$ is a monovalent condensable atom or monovalent condensable organic radical, and $R^6$ is a monovalent inert organic radical.

16. The silane-functional mixture of claim 1, wherein the at least one compound (B) is prepared by reacting:

at least one compound of the general formula XI:

$$R^9(\text{—}R^{12}\text{—}H)_q \quad \text{(XI);}$$

wherein q is an integer from 1 to 10;

$R^{12}$ is a divalent or trivalent linking functional group selected from the group consisting of —NH—, —N(—$R^6$)—NH—C(═$R^8$)—, —NH[—C(═$R^8$)—]$_2$, —NH—C(═$R^8$)—NH—, —NH—C(═$R^8$)—$R^7$—, —NH—C(═$R^8$)—NH—C(═$R^8$)—$R^7$—, —$R^7$—N═, —$R^7$—NH—C(═$R^8$)—, and —NH—C(═$R^8$)—NH—N═C<, wherein $R^6$ is a monovalent inert organic radical, $R^7$ is a divalent linking atom or a divalent linking functional group, and $R^8$ is an oxygen atom or a sulfur atom;

with at least one compound of the general formula XII:

$$R^8{=}C{=}N\text{—}R^{14}(\text{—}R^{15})_o \quad \text{(XII);}$$

wherein o is 1, 2, or 3;

$R^{14}$ is an at least divalent inert organic radical;

$R^{15}$ is a silane group of the general formula V:

$$\text{—}SiR^5_mR^6_{3-m} \quad \text{(V);}$$

wherein m is an integer from 1 to 3, $R^5$ is a monovalent condensable atom or monovalent condensable organic radical, and $R^6$ is a monovalent inert organic radical.

17. The silane-functional mixture of claim 1, comprising the at least one phosphonic diester (A), at least one diphosphonic diester (A), or at least one phosphonic diester and one diphosphonic diester (A) in an amount of 1% to 40% by weight, based on a total solids content of the mixture.

18. The silane-functional mixture of claim 1, comprising the at least one compound (B) in an amount of 60% to 99% by weight, based on a total solids content of the mixture.

19. The silane-functional mixture of claim 1, further comprising at least one additive (C).

20. The silane-functional mixture of claim 19, wherein the at least one additive (C) is selected from the group consisting of reactive and inert, oligomeric and polymeric, film-forming binders; crosslinking agents; reactive and inert, organic solvents; water; compounds which can be activated with actinic radiation; organic and inorganic, colored and achromatic, optical effect, electrically conductive, magnetically shielding, and fluorescent pigments; transparent and opaque, organic and inorganic fillers; nanoparticles; stabilizers; UV absorbers; light stabilizers; free-radical scavengers; photoinitiators; free-radical polymerization initiators; driers; devolatilizers; slip additives; polymerization inhibitors; defoamers; emulsifiers and wetting agents; adhesion promoters; flow control agents; film-forming assistants; rheology control additives; and flame retardants.

21. The silane-functional mixture of claim 1, comprising a total solids content of 20% to 100% by weight, based on the total weight of the mixture.

* * * * *